United States Patent
Dobrinski et al.

(10) Patent No.: US 10,396,538 B2
(45) Date of Patent: Aug. 27, 2019

(54) HINGED CLAMP FOR SPACER-DAMPER

(71) Applicant: Hubbell Incorporated, Shelton, CT (US)

(72) Inventors: Daniel David Dobrinski, Hillsboro, NH (US); Peter Chan, Toronto (CA)

(73) Assignee: Hubbell Incorporated, Shelton, CT (US)

( * ) Notice: Subject to any disclaimer, the term of this patent is extended or adjusted under 35 U.S.C. 154(b) by 198 days.

(21) Appl. No.: 15/432,414

(22) Filed: Feb. 14, 2017

(65) Prior Publication Data

US 2017/0155238 A1    Jun. 1, 2017

Related U.S. Application Data

(63) Continuation of application No. 14/177,917, filed on Feb. 11, 2014, now Pat. No. 9,570,897.

(51) Int. Cl.
*H02G 7/12* (2006.01)
*F16B 2/10* (2006.01)
*H02G 1/02* (2006.01)

(52) U.S. Cl.
CPC .............. *H02G 7/125* (2013.01); *F16B 2/10* (2013.01); *H02G 1/02* (2013.01); *Y10T 24/3907* (2015.01)

(58) Field of Classification Search
CPC ....... H02G 1/02; F16B 2/10; Y10T 29/49826; Y10T 403/32008; Y10T 403/7182
See application file for complete search history.

(56) References Cited

U.S. PATENT DOCUMENTS

| | | |
|---|---|---|
| 2,849,777 A | 9/1958 | Ridgers |
| 3,161,721 A | 12/1964 | Torr |
| 3,263,021 A | 7/1966 | Gaunt |
| 3,702,371 A | 11/1972 | Walter et al. |
| 3,784,723 A | 1/1974 | Cantamessa |
| 3,885,086 A | 5/1975 | Houston et al. |
| 3,892,455 A | 7/1975 | Sotolongo |
| 3,971,881 A | 7/1976 | Hawkins |
| 4,381,422 A | 4/1983 | Traini |
| 4,525,596 A | 6/1985 | Diana |
| 5,371,320 A | 12/1994 | Torok |
| 5,721,393 A | 2/1998 | Richardson, Jr. |
| 5,936,197 A | 8/1999 | Katoh et al. |

(Continued)

FOREIGN PATENT DOCUMENTS

| | | |
|---|---|---|
| CN | 202333693 | 7/2012 |
| EP | 1754293 | 9/2012 |

(Continued)

*Primary Examiner* — Jason L Vaughan
*Assistant Examiner* — Amanda Kreiling
(74) *Attorney, Agent, or Firm* — Michael Best & Friedrich, LLP (57) ABSTRACT

A clamp for a spacer-damper includes a first jaw and a second jaw connected to the first jaw. The first jaw has a first clamping surface and a first aperture. The first aperture retains the fastener in an initial position and in a second position spaced latterly from said initial position. The second jaw has a second clamping surface and an open-ended second aperture. The second aperture receives the fastener in the second position. The first jaw may also include a keeper surface for receiving the fastener in an initial position, a keeper pocket for receiving the fastener in a second position and a keeper protrusion is positioned between the keeper surface and the keeper pocket.

20 Claims, 9 Drawing Sheets

(56) References Cited

U.S. PATENT DOCUMENTS

| | | | |
|---|---|---|---|
| 6,096,970 | A | 8/2000 | Katoh et al. |
| 8,079,122 | B2 | 12/2011 | Kwon et al. |
| 8,449,308 | B2 | 5/2013 | Smith |
| 8,500,073 | B2 | 8/2013 | Smith |
| 2008/0173462 | A1 | 7/2008 | Whapham et al. |
| 2012/0088380 | A1 | 4/2012 | Smith |
| 2014/0333068 | A1 | 11/2014 | Ikushima |

FOREIGN PATENT DOCUMENTS

| | | |
|---|---|---|
| JP | 2009065782 | 3/2009 |
| WO | 2005107032 | 11/2005 |

HINGED CLAMP FOR SPACER-DAMPER

RELATED APPLICATION(S)

This application is a continuation of U.S. application Ser. No. 14/177,917, filed Feb. 11, 2014, the disclosure of which is incorporated herein by reference in its entirety and to which priority is claimed.

FIELD OF THE INVENTION

The present invention relates to clamps for conductors including spacer-dampers for power transmission lines.

BACKGROUND OF THE INVENTION

Utility lines are used to transmit power from a generating facility to a distribution point. Typically, high voltage conductor lines are bundled over long distances to efficiently and economically transfer power and must be spaced from one another to avoid damage.

Damage to individual conductors in bundled electrical transmission lines may be caused by the vibration and oscillation or galloping of the conductors. Such undesired motions may be induced by the wind, and may have longitudinal, transverse and vertical components. Suppression of these vibrations and oscillations requires a resilient connection between the conductors with all the conductors in a bundle being spaced from one another while allowing a limited amount of flexing to occur.

The motion of the conductors in a bundle may also be caused by electrical power surges, which cause the conductors in a bundle to be attracted toward the center thereof. For example, in a bundle of three conductors defining, in cross section, a triangle, a surge causes the conductors to be attracted to a point at the center of the triangle. Similarly, in a bundle of four conductors defining, in cross section, a quadrilateral, a surge causes the conductors to be attracted to a point at the center of the quadrilateral.

To avoid damage of the conductor lines, spacer-dampers are used to ensure sufficient distance between conductors and to provide vibration dampening. Spacer-dampers are attached to the conductors at certain intervals along the transmission distance. Because the transmission distance is often long, a large number of spacer-dampers are typically needed. The spacer-dampers must also be manually attached to the conductors, resulting in a labor intensive process.

SUMMARY OF THE INVENTION

In accordance with an embodiment, a clamp for a spacer-damper includes a first jaw and a second jaw connected to the first jaw. The first jaw has a first clamping surface and a first aperture. The first aperture retains the fastener in an initial position and in a second position spaced laterally from the initial position. The second jaw has a second clamping surface and an open-ended second aperture. The second aperture receives the fastener in the second position.

In accordance with a further embodiment, a clamp for a spacer-damper includes a first jaw and a second jaw connected to the first jaw. The first jaw has a first clamping surface, a first aperture for retaining a fastener, a keeper surface for receiving the fastener in an initial position and a keeper pocket for receiving the fastener in a second position. A keeper protrusion is positioned between the keeper surface and the keeper pocket. The second jaw has a second clamping surface and a second aperture for receiving the fastener in the second position.

In accordance with another embodiment, a spacer damper has a plurality of arms and a plurality of clamps connected to the plurality of arms. At least one of the arms includes a first jaw and a second jaw connected to the first jaw. The first jaw has a first hinge, a first arcuate clamping surface, and an enclosed first aperture for retaining a fastener. The first jaw also has a keeper surface for receiving the fastener in an initial position, a keeper protrusion, and a keeper pocket for receiving the fastener in a second position. The second jaw has a second hinge pivotally connected to the first hinge, a second arcuate clamping surface, and an open-ended second aperture for receiving the fastener in the second position.

Other embodiments, including apparatus, systems, methods, and the like which constitute part of the invention, will become more apparent upon reading the following detailed description of the exemplary embodiments and viewing the drawings. It is to be understood that both the foregoing general description and the following detailed description are exemplary and explanatory only and therefore not restrictive.

BRIEF DESCRIPTION OF THE DRAWINGS

The accompanying drawings are incorporated in and constitute a part of the specification. In such drawings.

DETAILED DESCRIPTION OF EXEMPLARY EMBODIMENT

Reference will now be made in detail to the exemplary embodiment of the invention as illustrated in the accompanying drawings, in which like reference characters designate like or corresponding parts throughout the drawings.

Figure 1:
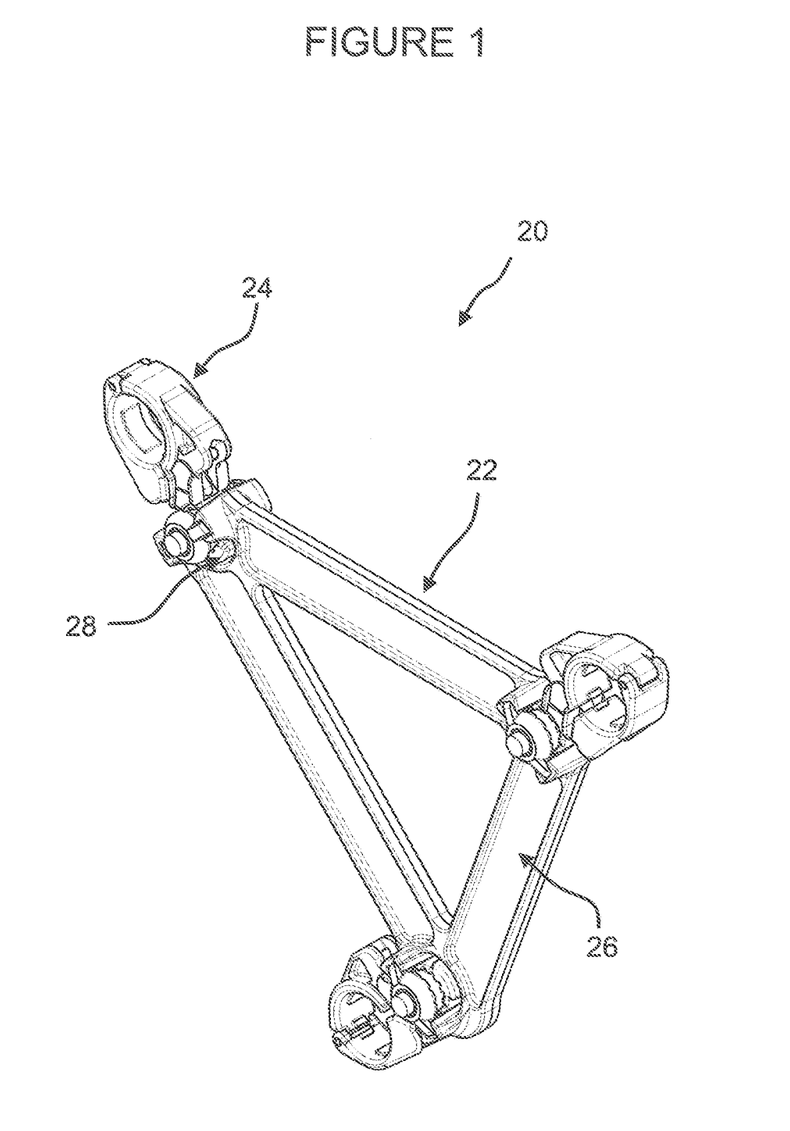
FIG. 1 is a perspective view of a spacer-damper according to an exemplary embodiment of the invention.

A spacer-damper 20 includes a frame 22 and a set of clamps 24. The frame 22 includes a plurality of rigid arms 26. The arms 26 may be formed as a unitary structure or may be separately formed and attached to one another. The arms 26 may be metallic, for example an aluminum alloy, or made from any suitable composite material. A corner 28 is formed at the connection of each arm 26 and a clamp 24 is positioned at each corner 28. The clamps 24 are pivotally connected with respect to the frame 22 and extend radially outwardly therefrom. Each clamp 24 includes an opening 30 for receiving a conductor C.

Figure 2:
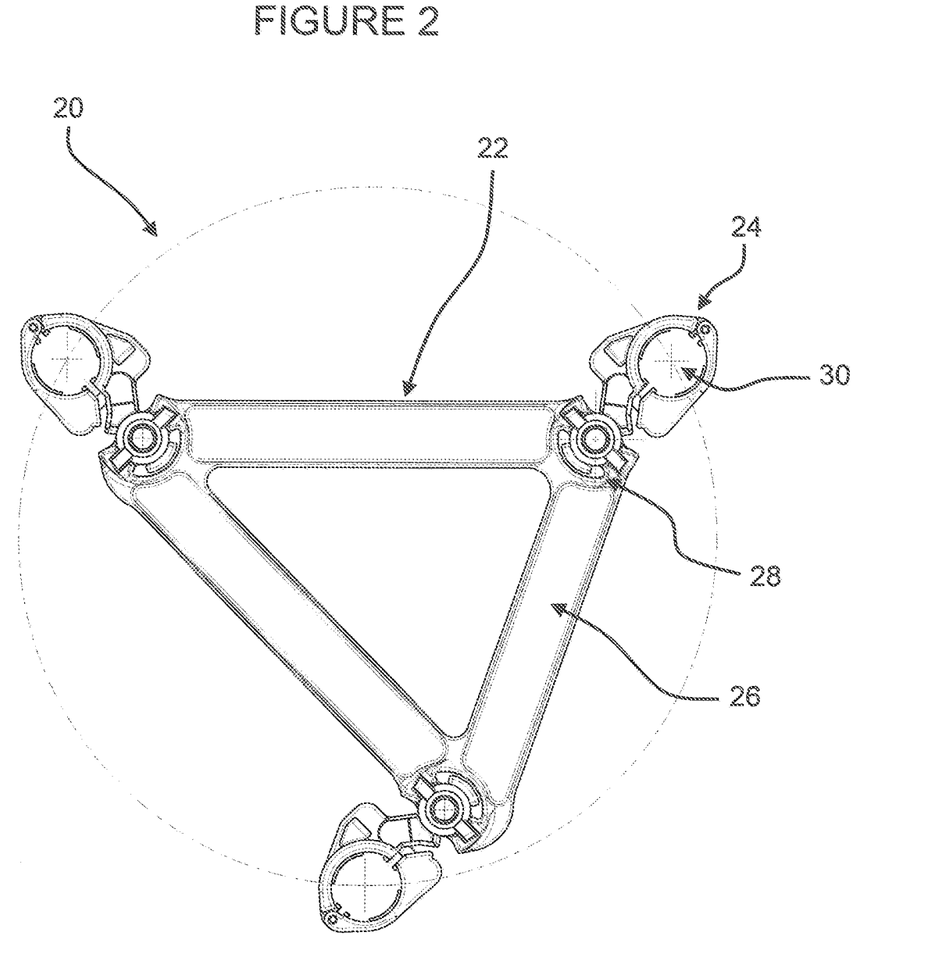
FIG. 2 is a front view of the spacer-damper of FIG. 1.

As best shown in FIG. 2, the center of each opening 30 may lay along a common circle. The clamps 24 may be connected to the frame 22 in a variety of manners as would be understood by one of ordinary skill in the art. The position of the clamps 24, as well as the size and spacing of the arms 22, may vary dependent on the application. Although the spacer-damper 20 depicted in FIGS. 1 and 2 has three arms 22 and three clamps 24, other combinations, for example one arm 22 and two clamps 24 or four arms 22 and four clamps 24, may be utilized to provide spacing and vibration damping for two, four, six, eight, or any number of individual conductors.

As best shown in FIGS. 3-10, the clamp 24 includes a first jaw 32 and a second jaw 34 pivotally connected to the first jaw 32. The second jaw 34 is moveable with respect to the first jaw 32 from an open position to a closed position. The first and second jaws 32, 34 may be held in the closed position by a mechanical fastener 36 having a first portion 38 and a second portion 40. In the exemplary embodiment shown in the FIGS. 3-10, the first portion 38 is a bolt and the second portion 40 is a nut, although any suitable mechanical fastener 36 may be used. When the first and second jaws 32, 34 are in the closed position, the mechanical fastener 36 may be tightened to prevent movement of the jaws 32, 34 with respect to one another.

The first jaw 32 has a arcuate first outer surface 42 and a ridge 44 extending from the first outer surface 42. The ridge 44 shelters the mechanical fastener 36 and helps prevent or minimize corona discharge around the clamp 24. An eyelet 46 is positioned between the ridge 44 and a portion of the first outer surface 42. The eyelet 46 assists a user in positioning the clamp 24 and also reduces the material and weight of the clamp 24. A leg 48 extends from the ridge 44 and connects to a journal member 50. The journal member 50 is substantially tordial in shape, having an opening for pivotally connecting to the frame 22. The journal member 50 includes a set of corrugations or radially extending teeth 52 allowing the journal member 50 to be locked in a series of set pivoted positions relative to the frame 22. An arcuate projection 54 extends outwardly from the journal member 50. The first jaw 32 may be a unitary structure or formed from multiple pieces.

Figure 10:
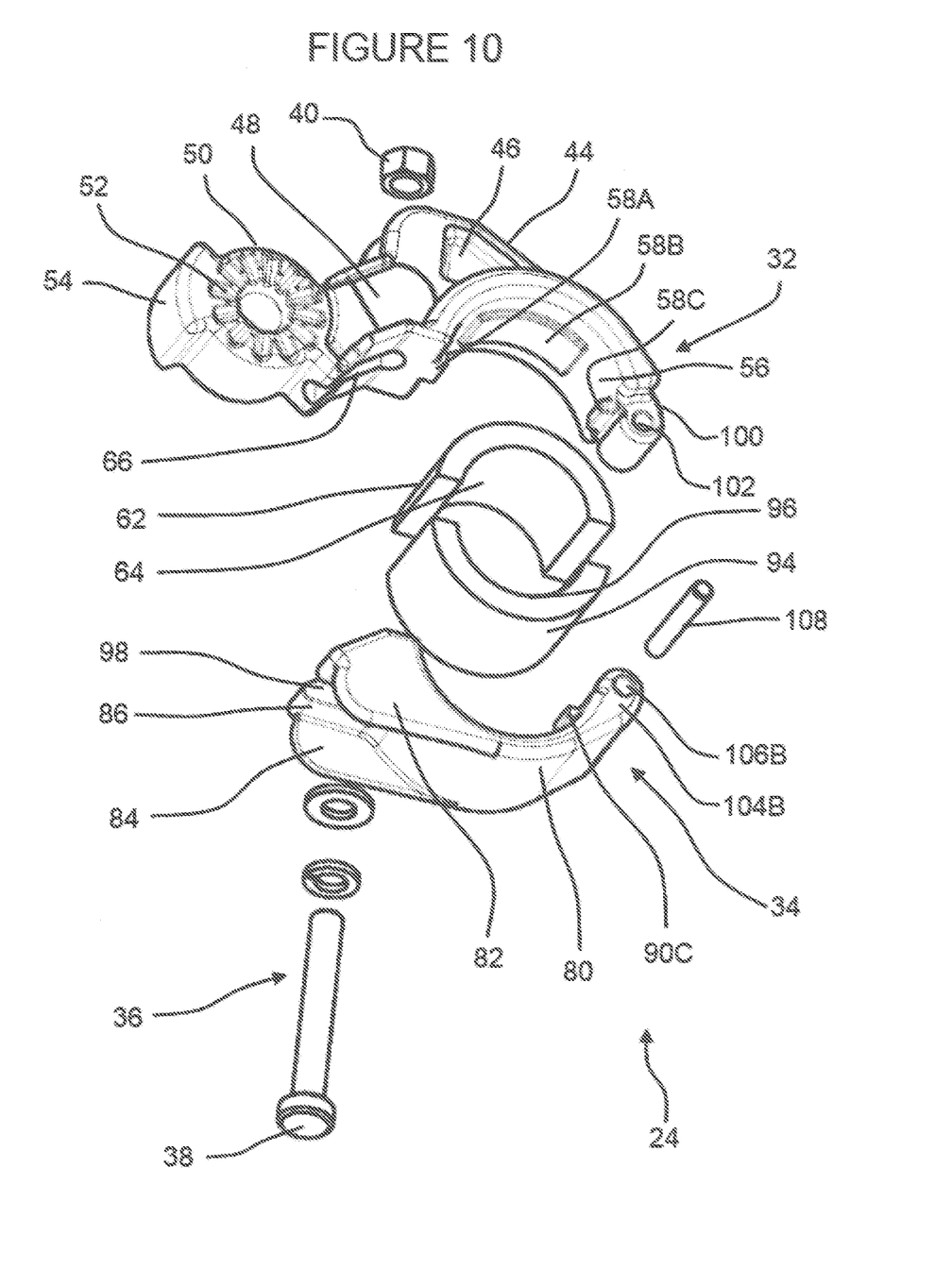
FIG. 10 is an exploded perspective view of the clamp of FIG. 3.

As best shown in FIG. 10, the first jaw 32 includes a first inner clamping surface 56. The first inner clamping surface 56 includes an arcuate surface designed to clamp a cylindrical conductor. Various alternative embodiments may utilize a non-round configuration, for example an elliptical or polygonal configuration, to clamp different shaped conductors. A set of protrusions 58A, 58B, 58C extend from the first inner clamping surface 56 to engage and retain a first bushing 60. The first bushing 60 has an outer surface 62 contacting the first jaw and an inner surface 64 for contacting a conductor. The first bushing 60 may also include depressions to mate with the protrusions 58A, 58B, 58C (not shown). The first bushing 60 provides damping and prevents damage to the conductor and the clamp 24 during use. The first bushing 60 may be made from an elastomeric material and have a high temperature resistance.

Figure 5:
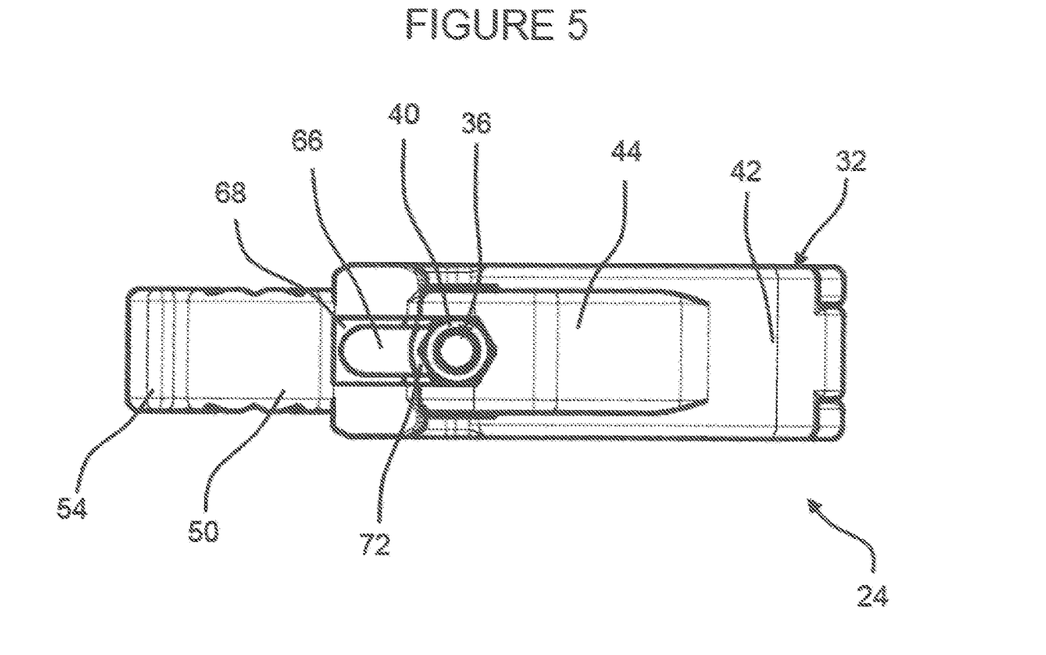
FIG. 5 is a top view of the clamp of FIG. 3.
Figure 6:
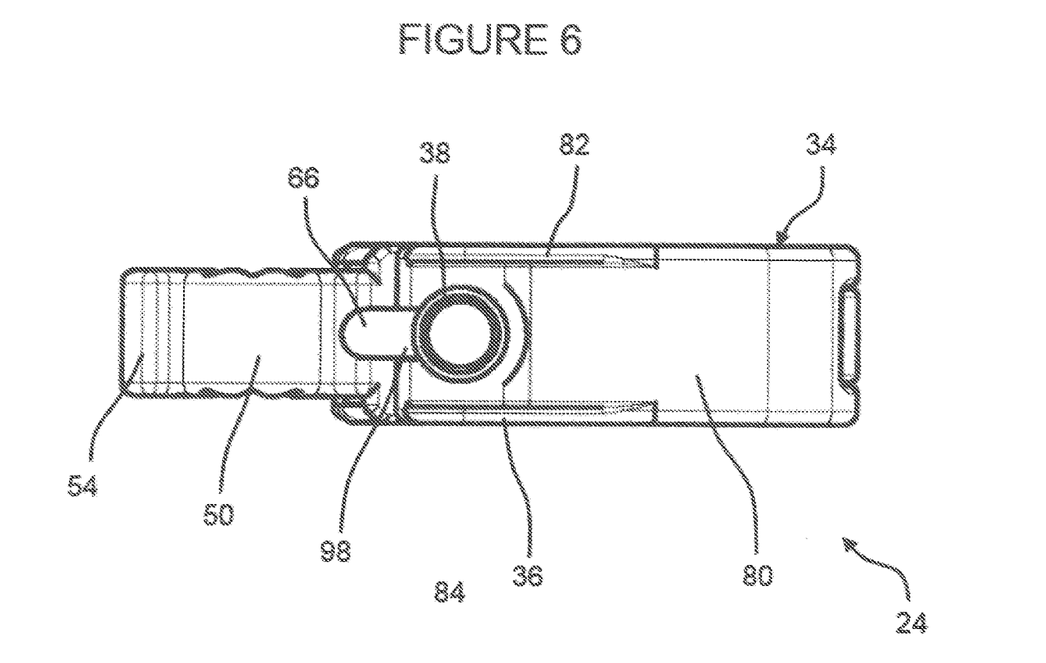
FIG. 6 is a bottom view of the clamp of FIG. 3.
Figure 7:
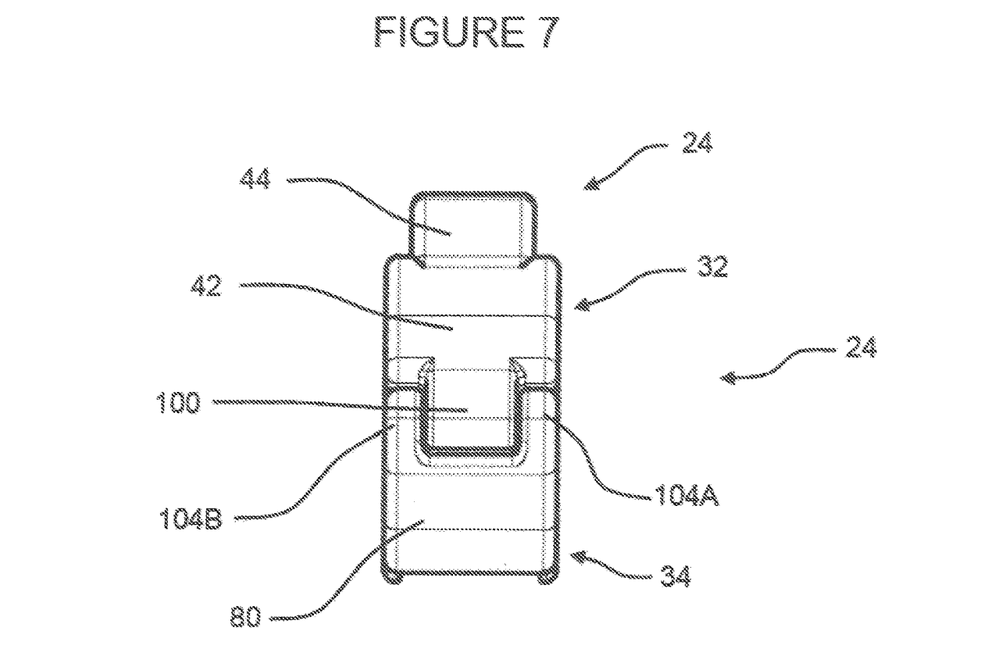
FIG. 7 is a front view of the clamp of FIG. 3.
Figure 8:
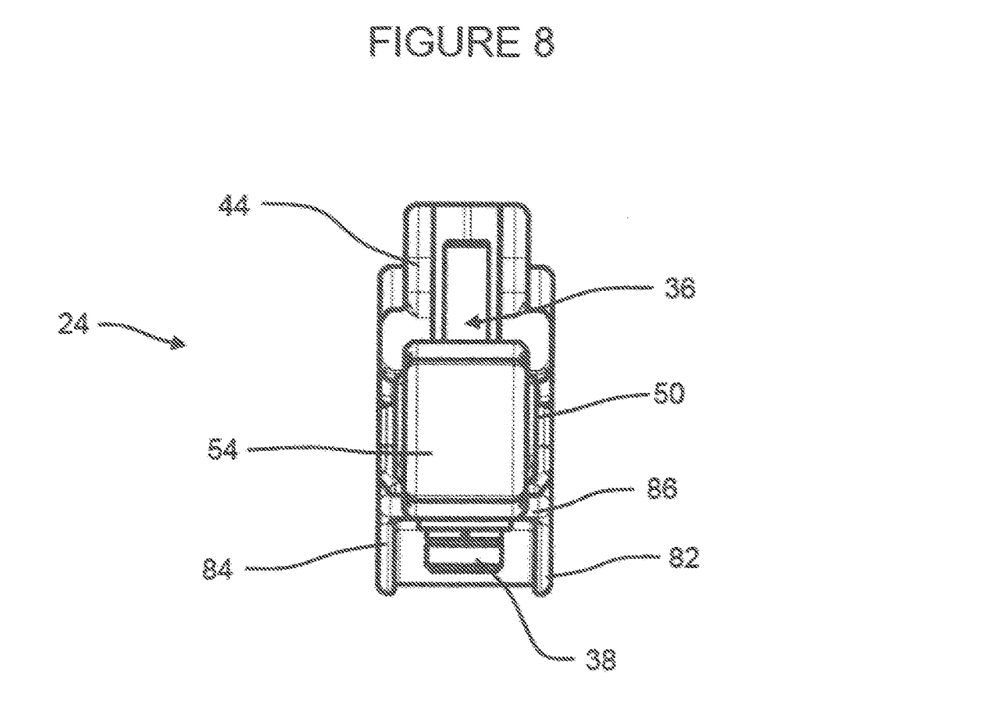
FIG. 8 is a rear view of the clamp of FIG. 3.
Figure 9:
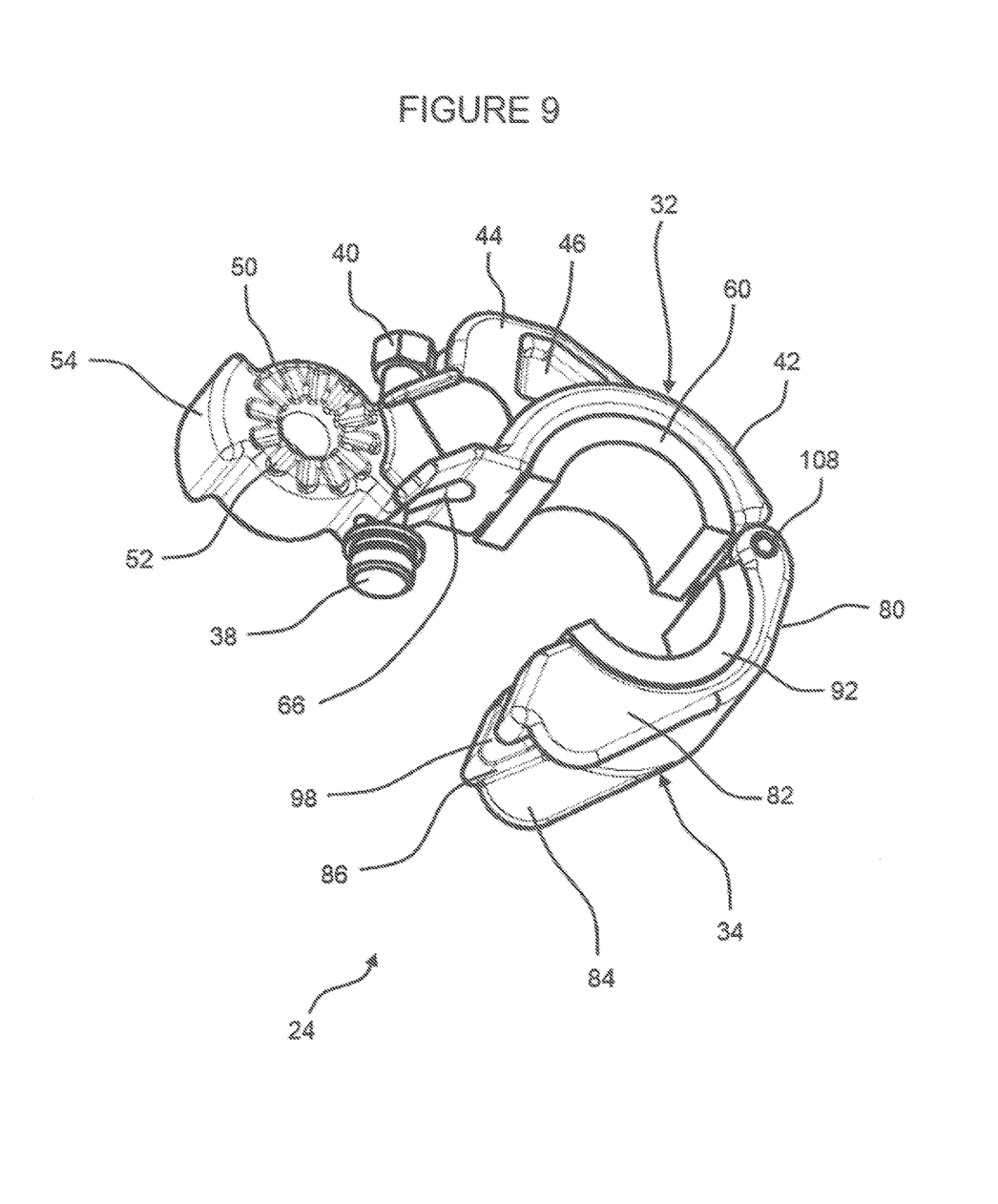
FIG. 9 is a perspective view of the clamp of FIG. 3 in the open position.

A first aperture 66 extends through the first jaw 32. As best shown in FIGS. 5 and 9, the first aperture 66 is a substantially obround or oblong opening that extends through at least a portion of the leg 48 and at least a portion of the ridge 44. In alternative embodiments, the position, size, and shape of the first aperture 66 may vary. The obround opening retains the mechanical fastener 36 allowing it to be moved laterally between a first position and a second position.

Figure 11:
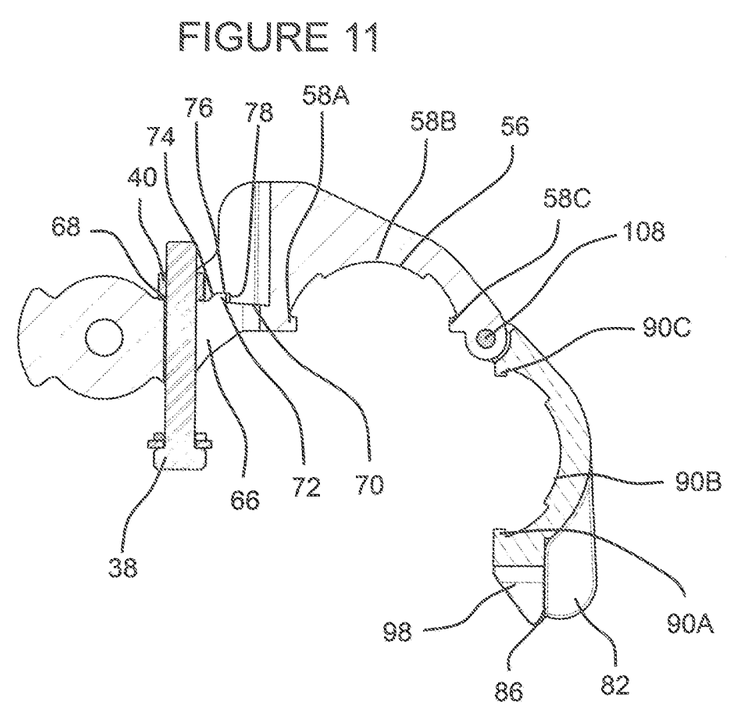
FIG. 11 is a side view in section of the clamp of FIG. 3 in the open position.

The first jaw 32 also includes a keeper surface 68 around at least a portion of the first aperture 66. The keeper surface 68 receives the mechanical fastener 36 in the initial position as shown in FIG. 11. In the initial position, the nut 40 may rest on the keeper surface 68 or the bolt 38 may simply be positioned in the first aperture 66 proximate the keeper surface 68. The initial position spaces the mechanical fastener 36 from the second jaw 34, allowing the second jaw 34 to be pivotally moved relative to the first jaw 32 without impedance.

Figure 12:
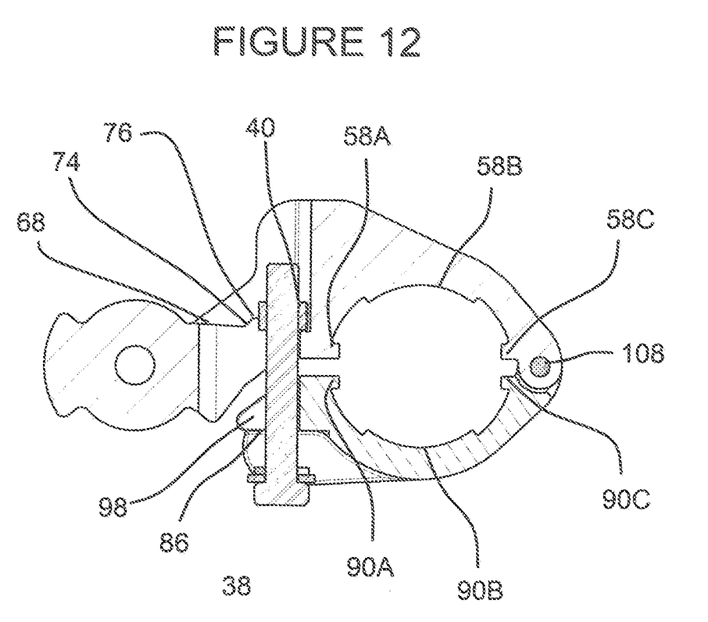
FIG. 12 is a side view in section of the clamp of FIG. 3 in the closed position.

As best shown in FIGS. 11 and 12, the first jaw 32 also includes a keeper pocket 70. The keeper pocket 70 receives the mechanical fastener 36 in a second position as depicted in FIG. 12. The keeper pocket 70 is a recessed area around at least a portion of the first aperture 66. In various exemplary embodiments, the keeper pocket 70 is sized or otherwise configured to engage the nut 40 to prevent rotation of the nut 40 with respect to the bolt 38.

A keeper protrusion 72 is positioned between the keeper surface 68 and the keeper pocket 70. The keeper protrusion 72 includes an inclined first side 74 adjacent the keeper surface 68, a planar top surface 76, and a vertical second side 78 adjacent the keeper pocket 70. The keeper protrusion 72 extends above the keeper surface 68 and the keeper pocket 70. The inclined first side 74 allows the nut 40 to slide over the keeper protrusion 72 and settle into the keeper pocket 70. The vertical second side 78 assists in retaining the nut 40 after it enters the keeper pocket 70. In various exemplary embodiments, the keeper protrusion 72 may be omitted and the keeper pocket 70 may be a depression adjacent the keeper surface 68. In other embodiments, the keeper pocket 70 and the keeper protrusion 72 may be omitted and the keeper surface 68 may receive the mechanical fastener 36 in the initial and second positions.

The second jaw 34 includes an arcuate second outer surface 80, a first extension 82 and a second extension 84 extending from the second outer surface 80, and a ledge 86 extending from the second outer surface 80. The ledge 86 is positioned at least partially between the first and second extensions 82, 84. The first and second extensions 82, 84 shelter the mechanical fastener 36 and help prevent or minimize corona discharge around the clamp 24. The second jaw 34 may be a unitary structure or formed from multiple pieces.

The second jaw 34 includes a second inner clamping surface 88 having an arcuate surface designed to clamp a cylindrical conductor. Various alternative embodiments may utilize a non-round configuration, for example, an elliptical or polygonal configuration, to clamp different shaped conductors. A set of protrusions 90A, 90B, 90C extend from the second inner clamping surface 88 to engage and retain a second resilient bushing 92. The second bushing 92 has an outer surface 94 contacting the second jaw 34 and an inner surface 96 for contacting a conductor. The second bushing 92 provides damping and prevents damage to the conductor and the clamp 24 during use. The second bushing 92 may also include depressions to mate with the protrusions 90A, 90B, 90C (not shown). The second bushing 92 may be made from an elastomeric material and have a high temperature resistance.

A second aperture 98 extends through the second jaw 34. The second aperture 98 is formed in the ledge 86 and is a U-shaped slot having an open end remote from the second inner clamping surface 88. In various alternative embodiments, the size, shape, and position of the second aperture 98 may vary. As best shown in FIG. 12, when the second jaw 34 is in the closed position, the mechanical fastener 36 may be moved from the initial opening position to a second locking position, passing into the second aperture 98. As the mechanical fastener 36 is tightened, a portion of the mechanical fastener, for example a head or one or more washers associated with the head, contacts the ledge 86 to hold the second jaw 34 in the closed position.

Figure 3:
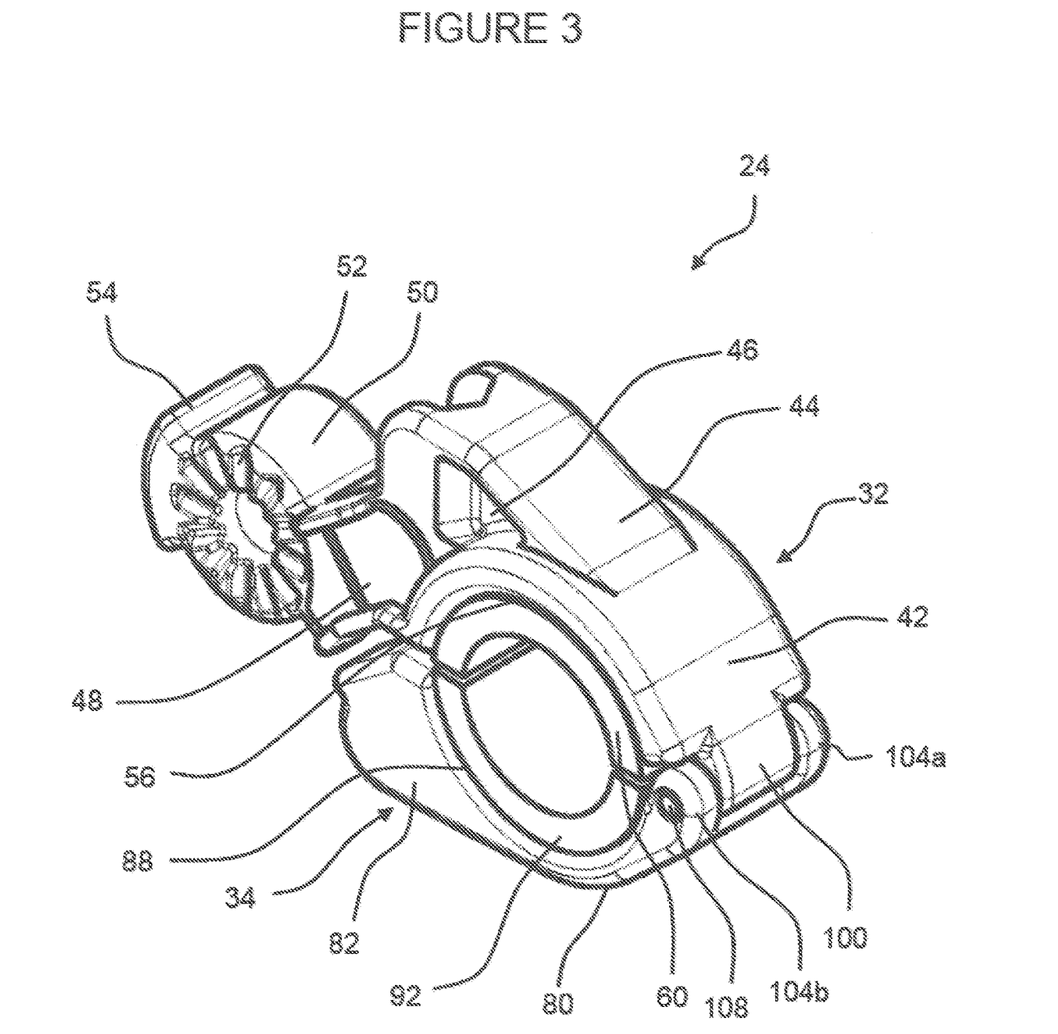
FIG. 3 is a perspective view of a clamp in a closed position according to an exemplary embodiment of the invention.
Figure 4:
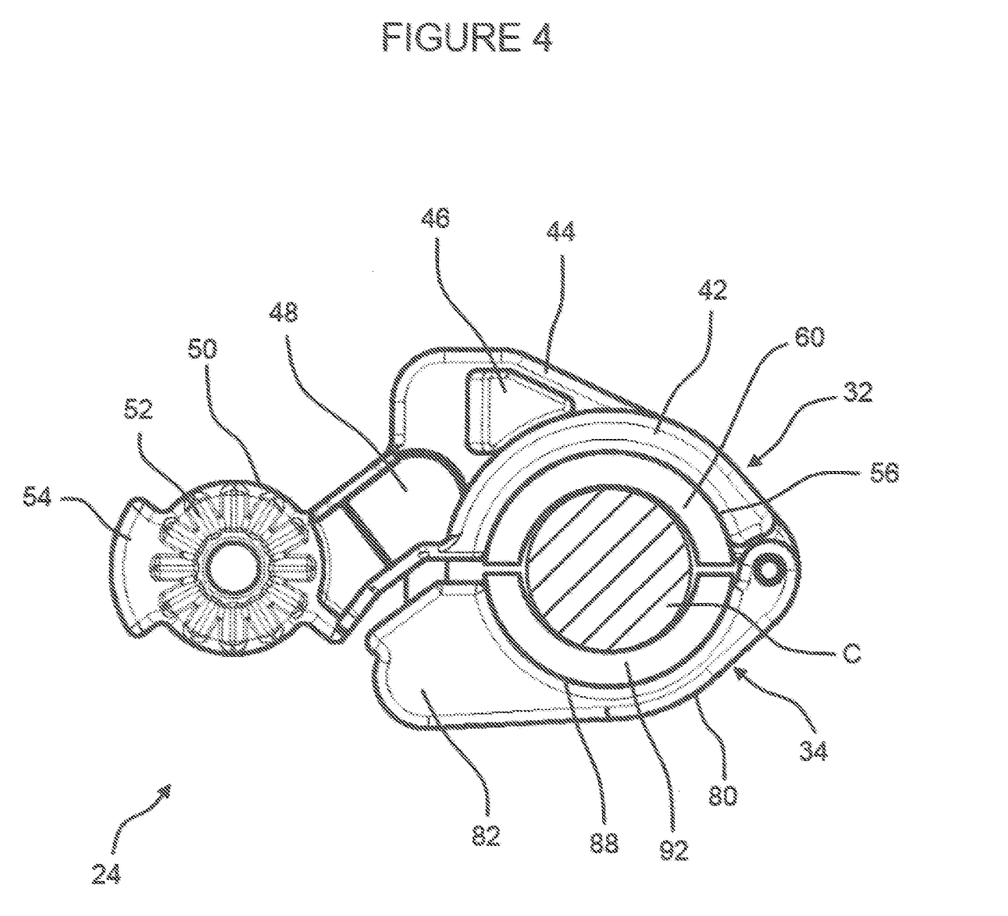
FIG. 4 is a side view of the clamp of FIG. 3.

The second jaw 34 is pivotally connected to the first jaw 32. The first jaw 32 includes a first hinge member and the second jaw includes a second hinge member. As best shown in FIGS. 3 and 10, the first hinge member includes an inner hinge 100 having a first hinge opening 102 and the second hinge member includes a pair of outer hinges 104A, 104B each having an outer hinge opening 106A, 106B. The inner hinge 100 is positioned between the outer hinges 104A, 104B, aligning the first and second hinge openings 102, 106A, 106B. A pin 108 is then inserted through the first and second hinge openings 102, 106A, 106B. The pin 108 may be retained in the first and second openings 102, 106A, 106B through an interference fit or other means. Alternative embodiments may utilize different structures to pivotally connect the first jaw 32 and the second jaw 34. The first and second jaw 32, 34 may also be moveably connected together in a different manner, for example a sliding connection.

In operation, the spacer-damper 20 is positioned between a group of conductors. The mechanical fastener 36 is retained in the first aperture 66 of the first jaw 32. The mechanical fastener 36 may include a screw or bolt 38 having a head and threaded portion for receiving a nut 40. The nut 40 may be a locking nut that will resist loosening once tightened and may also be configured to prevent the nut 38 from being completely removed from the bolt 38, for example through deformations or distortions of the threads on the nut or the bolt.

The clamp 24 is held proximate the conductor with the second jaw 34 in the open position. In this stage, the mechanical fastener 36 is placed in the initial position proximate, or in contact with the keeper surface 68. The second jaw 34 is then rotated into the closed position so that the first and second jaws 32, 34 at least partially enclose the conductor. The mechanical fastener 36 is then moved from the initial position to the second position where it is received in the second aperture 98. In the exemplary embodiment, the mechanical fastener 36 is moved over the keeper protrusion 72, sliding up and over the inclined surface 74 and the top surface 76, and then settled into the second position inside the keeper pocket 70. The mechanical fastener 36 may be capable of translating from the first position to the second position, although some rotation of the mechanical fastener 36 may be caused by the keeper protrusion 72. In various alternative embodiments the keeper protrusion 72 and the keeper pocket 70 may be omitted or only the keeper protrusion 72 may be omitted. Once the mechanical fastener 36 is in the second position, a tool may be used to rotate the bolt 38. The nut 40 is held in the keeper pocket 70 configured to prevent rotation of the nut 40 as the bolt 38 is turned, allowing the mechanical fastener 36 to be tightened using a single tool.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

What is claimed:

1. A method of connecting a spacer-damper to a utility line comprising:
    positioning a spacer-damper to connect to a utility line, the spacer-damper including a first jaw, a second jaw pivotally connected to the first jaw, and a fastener having an axial length and a radial width, wherein the first jaw includes a first clamping surface defining a first clamping region, a first aperture receiving the fastener and allowing the fastener to move radially between a first section of the aperture and a second section of the aperture spaced laterally from the first section, a keeper surface positioned above the first section of the aperture, and a keeper pocket positioned above the second section of the aperture, and wherein the second jaw includes a second clamping surface and an open-ended second aperture;
    engaging the first jaw with a conductor;
    pivoting the second jaw from an open position to a closed position adjacent the conductor;
    moving the fastener in the radial direction from the first section of the first aperture to the second section of the first aperture; and
    tightening the fastener to secure the first and second jaws to the conductor.

2. The method of claim 1, wherein the keeper pocket is recessed from the keeper surface and moving the fastener from the first section to the second section further comprises moving the fastener in the axial direction.

3. The method of claim 1, wherein the fastener includes a bolt having a head and a nut connected to the bolt, and wherein moving the fastener from the first section to the second section moves the nut from the keeper surface to the keeper pocket.

4. The method of claim 3, wherein the keeper pocket is sized and shaped to prevent rotation of the nut.

5. The method of claim 1, wherein the fastener is positioned outside of the second aperture when the second jaw is in the open position and the fastener is at least partially in the second aperture when the second jaw is in the closed position and the fastener is in the second section of the first aperture.

6. The method of claim 1, wherein moving the fastener from the first section to the second section is done subsequent to pivoting the second jaw from the open position to a closed position.

7. The method of claim 6, wherein at least a portion of the fastener is positioned outside of the second aperture when the second jaw is in the closed position.

8. The method of claim 7, wherein the entire fastener is positioned outside of the second aperture when the second jaw is in the closed position.

9. The method of claim 1, wherein the moving the fastener from the first section to the second section includes moving the fastener over a keeper protrusion separating the keeper surface and the keeper pocket.

10. A method of connecting a spacer-damper to a utility line comprising:
    positioning a spacer-damper to connect to a utility line, the spacer-damper including a first jaw, a second jaw pivotally connected to the first jaw, and a fastener having an axial length and a radial width, wherein the first jaw includes a first clamping surface defining a first clamping region, a first aperture receiving the fastener and configured to allow the fastener to move radially between a first section of the aperture and a second section of the aperture spaced laterally from the first section, a keeper surface positioned above the first section of the aperture, a keeper pocket positioned above the second section of the aperture, and a keeper protrusion positioned between the keeper surface and the keeper pocket, and wherein the second jaw includes a second clamping surface and an open-ended second aperture;

engaging the first jaw with a conductor;

pivoting the second jaw from an open position to a closed position adjacent the conductor;

moving the fastener in the radial direction from the first section of the first aperture, over the keeper protrusion, and to the second section of the first aperture; and tightening the fastener to secure the first and second jaws to the conductor.

11. The method of claim 10, wherein the keeper pocket is recessed from the keeper surface and moving the fastener from the first section to the second section further comprises moving the fastener in a first axial direction over the keeper protrusion and in a second axial direction into the keeper pocket.

12. The method of claim 10, wherein the fastener includes a bolt having a head and a nut connected to the bolt, and wherein moving the fastener from the first section to the second section moves the nut from the keeper surface to the keeper pocket.

13. The method of claim 12, wherein the keeper pocket is sized and shaped to prevent rotation of the nut.

14. The method of claim 12, wherein the keeper protrusion includes an inclined side adjacent the keeper surface configured to allow the nut to slide along the inclined side and over the keeper protrusion when moving the fastener from the first section to the second section.

15. The method of claim 10, wherein the fastener is positioned outside of the second aperture when the second jaw is in the open position and the fastener is at least partially in the second aperture when the second jaw is in the closed position and the fastener is in the second section of the first aperture.

16. The method of claim 10, wherein moving the fastener from the first section to the second section is done subsequent to pivoting the second jaw from the open position to a closed position.

17. A method of connecting a spacer-damper to a utility line comprising:

providing a spacer-damper having a plurality of arms and a plurality of clamps connected to the plurality of arms, wherein at least one of the plurality of clamps includes a first jaw, a second jaw pivotally connected to the first jaw, and a fastener having an axial length and a radial width, wherein the first jaw includes a first clamping surface defining a first clamping region, a first aperture receiving the fastener and allowing the fastener to move radially between a first section of the aperture and a second section of the aperture spaced laterally from the first section, a keeper surface positioned above the first section of the aperture, and a keeper pocket positioned above the second section of the aperture, and wherein the second jaw includes a second clamping surface and an open-ended second aperture;

engaging the first jaw with a conductor;

pivoting the second jaw from an open position to a closed position adjacent the conductor;

moving the fastener in the radial direction from the first section of the first aperture to the second section of the first aperture; and tightening the fastener to secure the first and second jaws to the conductor.

18. The method of claim 17, wherein the conductor is an overhead power transmission line.

19. The method of claim 17, wherein the moving the fastener from the first section to the second section includes moving the fastener over a keeper protrusion separating the keeper surface and the keeper pocket.

20. The method of claim 17, wherein the fastener is positioned outside of the second aperture when the second jaw is in the open position and the fastener is at least partially in the second aperture when the second jaw is in the closed position and the fastener is in the second section of the first aperture.

* * * * *